United States Patent
Bastug et al.

(10) Patent No.: US 8,462,756 B2
(45) Date of Patent: Jun. 11, 2013

(54) SYMBOL-LEVEL ADAPTATION METHOD FOR EQUALIZER COEFFICIENTS, MEMORY, EQUALIZER AND RECEIVER FOR IMPLEMENTING THE METHOD

(75) Inventors: Ahmet Bastug, Sophia (FR); Pierre Demaj, Nice (FR)

(73) Assignee: ST-Ericsson SA, Geneva (CH)

( * ) Notice: Subject to any disclaimer, the term of this patent is extended or adjusted under 35 U.S.C. 154(b) by 786 days.

(21) Appl. No.: 12/162,818

(22) PCT Filed: Jan. 31, 2007

(86) PCT No.: PCT/IB2007/050330
§ 371 (c)(1),
(2), (4) Date: Jul. 31, 2008

(87) PCT Pub. No.: WO2007/088516
PCT Pub. Date: Aug. 9, 2007

(65) Prior Publication Data
US 2009/0028124 A1    Jan. 29, 2009

(30) Foreign Application Priority Data
Feb. 3, 2006    (EP) .................................. 06300105

(51) Int. Cl.
*H04B 7/216*    (2006.01)
(52) U.S. Cl.
USPC ........................................................ 370/342
(58) Field of Classification Search
USPC ........................................................ 370/342
See application file for complete search history.

(56) References Cited

U.S. PATENT DOCUMENTS

| | | | |
|---|---|---|---|
| 6,175,588 B1* | 1/2001 | Visotsky et al. | 375/148 |
| 6,680,902 B1 | 1/2004 | Hudson | |
| 7,010,070 B2* | 3/2006 | Li et al. | 375/349 |
| 2003/0147455 A1* | 8/2003 | Simoni et al. | 375/148 |
| 2004/0223480 A1* | 11/2004 | Nguyen et al. | 370/342 |
| 2005/0025267 A1* | 2/2005 | Reznik et al. | 375/346 |

FOREIGN PATENT DOCUMENTS

EP    1259039 A    11/2002

OTHER PUBLICATIONS

Uzmi, Z.A.; Narasimha, M.J.; , "Maximizing system capacity in a sub-symbol based DS-CDMA multiuser detector," Global Telecommunications Conference, 2000. Globecom '00. IEEE, vol. 1, No., pp. 15-19 vol. 1, 2000.*

(Continued)

*Primary Examiner* — Derrick Ferris
*Assistant Examiner* — Kodzovi Acolatse
(74) *Attorney, Agent, or Firm* — William J. Kubida; Peter J. Meza; Hogan Lovells US LLP (57)    ABSTRACT

A symbol-level adaptation method to adapt at least one coefficient of an equalizer, the method comprising the steps of:
  a) executing an adaptive algorithm that calculates the value of the equalizer coefficient, the adaptive algorithm having a tunable parameter that determines how close the calculated coefficient value is to the optimal solution,
  b) modifying the value of the equalizer coefficient according to the calculated coefficient value at an intermediate instant $t_\Delta$ strictly between two consecutive instants $t_A$ and $t_B$, instants $t_A$ and $t_B$ corresponding to the beginning and the end of a pilot symbol period, respectively, and
  c) adjusting the value of the tunable parameter according to a number $\Delta$ representing the number of chips yet to be received before instant $t_B$ or already received since instant $t_A$.

3 Claims, 5 Drawing Sheets

OTHER PUBLICATIONS

Kwong, R.H.; Johnston, E.W.; , "A variable step size LMS algorithm," Signal Processing, IEEE Transactions on , vol. 40, No. 7, pp. 1633-1642, Jul. 1992.*

Colin D. Frank; Eugene Visotsky; Upamanyu Madhow ("Adaptive Interference Suppression for the Downlink of a Direct Sequence CDMA System with Long Spreading Sequences", Kluwer Journal of VLSI Signal processing, vol. 30, 2002).*

Colin D. Frank, Eugene Visotsky, Upamanyu Madhow; "Adaptive Interference Suppression for the Downlink of a Direct Sequence CDMA System With Long Spreading Sequence", [Online] Retrieved on Jun. 1, 2007. http://66.102.1.104/scholar?hl=nl&lr=&q=cache:u5FYWaePTHgJ:www.ece.ucsb.edu/Faculty/Madhow/Publications/FVM_final.ps+>.

Widrow B et al; "On the Statistical Efficiency of the LMS Family of Adaptive Algorithms", Neural Networks, 2003. Proceedings of the International Joint Conference on . . . , vol. 4, p. 2872-2889, Jul. 20-24, 2003. Piscataway, NJ, USA, IEEE.

Margetts A R et al; "Adaptive Chip-Rate Equalization of Downlink Multirate Wideband CDMA", IEEE Transactions on Signal Processing, IEEE Service Center, New York, NY, US. Vol. 53. No. 6, Jun. 2995, p. 2205-2215.

Colin D. Frank, Eugene Visotsky, Upamanyu Madhow; "Adaptive Interference Suppression for the Downlink of a Direct Sequence CDMA System With Long Spreading Sequence", Journal of VLSI Signal Processing, Vol. 30, No. 1, p. 273-291, Mar. 2002.

* cited by examiner

SYMBOL-LEVEL ADAPTATION METHOD FOR EQUALIZER COEFFICIENTS, MEMORY, EQUALIZER AND RECEIVER FOR IMPLEMENTING THE METHOD

FIELD OF THE INVENTION

The present invention relates to a symbol-level adaptation method for equalizer coefficients, a memory, an equalizer and a receiver for implementing the method.

BACKGROUND OF THE INVENTION

The terminology used throughout this specification corresponds to that defined in 3GPP (Third Generation Partnership Project) standards concerning CDMA (Code Division Multiple Access) communication systems like UMTS (Universal Mobile Telecommunication System).

It is noted that in CDMA communication systems, spreading is applied to the physical channels used to transmit data symbols from an emitter to a receiver. Spreading comprises at least a channelization operation which transforms every data symbol into a chip sequence made up of a plurality of chips, thus increasing the bandwidth of the transmitted signal. A chip is the minimal duration keying element. The number of chips per data symbol is called the spreading factor.

During the channelization operation, each data symbol from one channel is multiplied by a channelization code. Generally, a plurality of channels are simultaneously transmitted from the emitter to the receiver. Each channel is associated with its own channelization code. In orthogonal CDMA systems, the channelization codes are orthogonal. For example, OVSF (Orthogonal Variable Spreading Factor) codes are used.

In CDMA communication systems, transmission from the emitter to the receiver includes at least one pilot channel and a plurality of traffic channels. The pilot channel is used to transmit predetermined data symbols known by each receiver. These predetermined data symbols are called pilot symbols. The pilot channel can be despread by all receivers.

Each traffic channel is intended to be despread by a single receiver. Therefore, each traffic channel is spread using a channelization code known only by both the emitter and this receiver. The pilot channel, on the contrary, is spread using a channelization code known by the emitter and all receivers.

Equalizers are used in orthogonal CDMA receivers to equalize the channels received at the receiver, thus approximately restoring the orthogonality amongst the received chip sequences and reducing the interchip interferences (ICI). In other words, the equalizer corrects channel distortions at chip level.

Channel distortions vary in time. Thus, it is necessary to adapt the equalizer coefficients to track the channel changes. To this end, there are methods to adapt the equalizer coefficients according to channel distortions. The existing methods include the step of (hereinafter referred as step a)):

executing an adaptive algorithm that calculates the value of the equalizer coefficient that minimizes an error between a pilot symbol estimation outputted by a despreader and the corresponding expected pilot symbol, the adaptive algorithm having a tunable parameter that determines how close the calculated coefficient value is to the optimal solution.

These existing methods are known as "symbol-level adaptation", because the error to be minimized is the error between a despread pilot symbol and the corresponding expected pilot symbol. If, on the contrary, the error to be minimized is the error between a chip of the pilot symbol and the corresponding chip of the expected pilot symbol, the adaptation method is known as "chip-level adaptation". The difference between symbol-level adaptation and chip-level adaptation is described in further detail in article D1:

Colin D. Frank, Eugene Visotsky and Upamanyu Madhow "Adaptive interference suppression for the downlink of a direct sequence CDMA system with long spreading sequence"; Journal of VLSI Signal Processing, vol. 30, no. 1, pp 273-291, March 2002.

Symbol-level adaptation methods have proven to be efficient. However, symbol-level adaptations can only be done at pilot symbol rate. In fact, it is necessary to wait for the reception of every chip of a pilot symbol before starting despreading this pilot chip sequence to obtain a reliable estimation of the pilot symbol from which the error can be calculated. For example, if the pilot channelization code has a spreading factor of 256, symbol adaptation can be carried out only every 256 chip intervals. Consequently, the symbol-level adaptation methods are slow in tracking fast-changing channels.

A solution to this problem has already been proposed in U.S. Pat. No. 6,175,588 in the name of Visotsky et al. More precisely, U.S. Pat. No. 6,175,588 discloses how to despread pilot symbols using a channelization code shorter than the full pilot channelization code so as to generate a pilot symbol estimation at a higher rate than the pilot symbol rate. However, the shorter pilot channelization code is not orthogonal to other simultaneously used channelization codes. As a result, the obtained pilot symbol estimation is strongly disturbed by other symbols that are simultaneously received over other channels. The reliability of this method is poor.

SUMMARY OF THE INVENTION

Accordingly, it is an object of the invention to provide a symbol-level adaptation method that can better track fast-changing channels.

The invention provides a symbol-level adaptation method that includes the steps of:

modifying the value of the equalizer coefficient according to the calculated coefficient value at an intermediate instant $t_\Delta$ strictly between two consecutive instants $t_A$ and $t_B$, instants $t_A$ and $t_B$ corresponding to the beginning and the end of a pilot symbol period, respectively (hereinafter referred as step b)), and adjusting the value of the tunable parameter according to a number $\Delta$ representing the number of chips yet to be received before instant $t_B$ or already received since instant $t_A$ (hereinafter referred as step c)).

Adapting the equalizer coefficients between instants $t_A$ and $t_B$ allows to better track fast-changing channels, because the adaptation is carried out more often. However, at instant $t_\Delta$ between instants $t_A$ and $t_B$ the channelization code used to despread the pilot symbol is not fully orthogonal to other simultaneously used channelization codes. Thus, at instant $t_\Delta$, the pilot symbol estimation is not as reliable as the pilot symbol estimation obtained at instant $t_A$ or $t_B$. Furthermore, the Applicant has noted that when the absolute value of number $\Delta$ increases, the reliability of the pilot symbol estimation decreases. Adjusting the tunable parameter according to number $\Delta$ permits to compensate for this decrease in reliability. For example, when number $\Delta$ increases, the tunable parameter is adjusted to obtain calculated coefficient values that are closer to the optimal solution than when number $\Delta$ is null. As a result, the reliability of the pilot symbol estimation can be maintained roughly constant, whereas the adaptive algorithm execution time decreases as the absolute value of number Δ decreases, for example. Thus, by adjusting the tunable parameter according to number Δ, it is possible to compensate at least partially the negative consequences due to the fact that the despreading of the pilot symbol is done using a channelization code that is not fully orthogonal to other simultaneously used channelization codes.

The embodiments of the above method may comprise one or several of the following features:
  the tunable parameter is adjusted to obtain a calculated coefficient value which is closer to the optimal solution as the absolute value of number Δ increases,
  step b) is not executed if the absolute value of number Δ is greater than a threshold $\Delta_{max}$, where $\Delta_{max}$ is a positive integer strictly smaller than half the smallest-used spreading factor.
  the adaptive algorithm is a MMSE (Minimizing Means Square Error) algorithm, wherein the tunable parameter is a step-size μ and wherein step-size μ is lowered as the absolute value of number Δ increases.
  the despreader uses the full pilot channelization code to obtain the pilot symbol estimation used in step a).
  during step c), the value of the tunable parameter is also adjusted according to an estimation of a signal-to-interference ratio or according to an estimation of an orthogonal CDMA receiver speed.

The above embodiments of the terminal present the following advantages:
  adjusting the tunable parameter to obtain calculated coefficients which are closer to the optimal solution as number Δ increases allows to compensate for the consequences of having a pilot symbol estimation reliability that decreases as a function of the absolute value of number Δ,
  not modifying the value of the equalizer coefficients if the absolute value of number Δ is greater than a threshold $\Delta_{max}$ avoids adaptation of the equalizer coefficients if the reliability in the pilot symbol estimation is too small,
  using the MMSE algorithm allows to suppress both noise and interchip interferences at the same time,
  using the full pilot channelization code to obtain the pilot symbol estimation increases the reliability of the pilot symbol estimation, and
  adjusting the tunable parameter according to the signal-to-interference ratio or according to the receiver speed allows to further increase the reliability of the obtained pilot symbol estimation.

The invention also relates to a memory having instructions to execute the above symbol-level adaptation method.

The invention also relates to an adaptive equalizer to be used in an orthogonal CDMA receiver to correct channel distortions at chip level. This equalizer has at least one tunable coefficient and a calculator able to carry out the above symbol-level adaptation method.

The invention also relates to an orthogonal CDMA receiver comprising the above adaptive equalizer.

These and other aspects of the invention will be apparent from the following description, drawings and claims.

DETAILED DESCRIPTION

Figure 1:
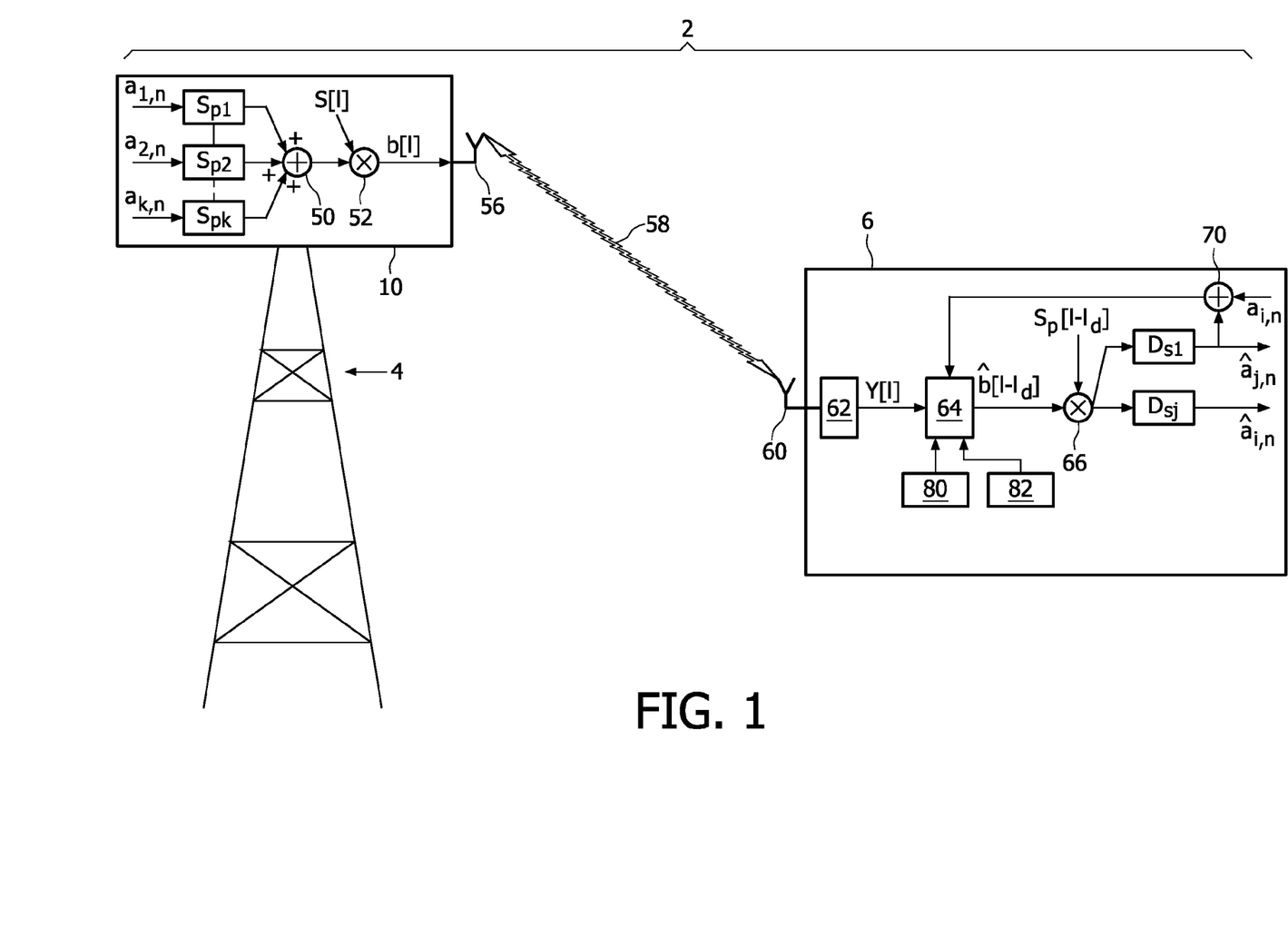
FIG. 1 is a schematic diagram of the architecture of an orthogonal CDMA communication system.

FIG. 1 shows an orthogonal CDMA communication system 2. In the following description, functions or constructions well known to a person of ordinary skill in the art are not described in detail.

For example, system 2 is a wireless telecommunication network like a UMTS system.

For simplicity, only one base station 4 and only one user equipment are shown. For example, the user equipment is a radio receiver 6 like a mobile phone.

Base station 4 has a radio orthogonal CDMA emitter 10 to transmit data symbols to many user equipments within a cell.

For example, emitter 10 conforms to the specification of 3GPP TS 25.213 standards concerning spreading and modulation. Therefore, only the details of emitter 10 necessary to understand the invention are described here.

Emitter 10 is designed to transmit simultaneously K data symbols $a_{1,n}, a_{2,n}, \ldots, a_{i,n}, \ldots, a_{K,n}$, where index i identifies a channel and index n identifies the order number of the symbol transmitted through channel i. For illustration purposes only, we assume here that symbol $a_{1,n}$ is a pilot symbol to be transmitted in the channel known as PCPICH (Primary Common Pilot Channel). We also assume that symbol $a_{2,n}$ is the symbol to be transmitted through a PCCPCH (Primary Common Control Physical Channel). The other symbols, $a_{3,n}$ to $a_{K,n}$, are to be transmitted in other channels defined in the UMTS standards, such as traffic channels, for example.

Each symbol $a_{i,n}$ is transmitted to a respective module $S_{pi}$ that performs a channelization operation. More precisely, each module $S_{pi}$ multiplies the received symbol $a_{i,n}$ by a channelization code $C_i$ which is orthogonal to any other channelization codes simultaneously used for other channels.

Figure 2:
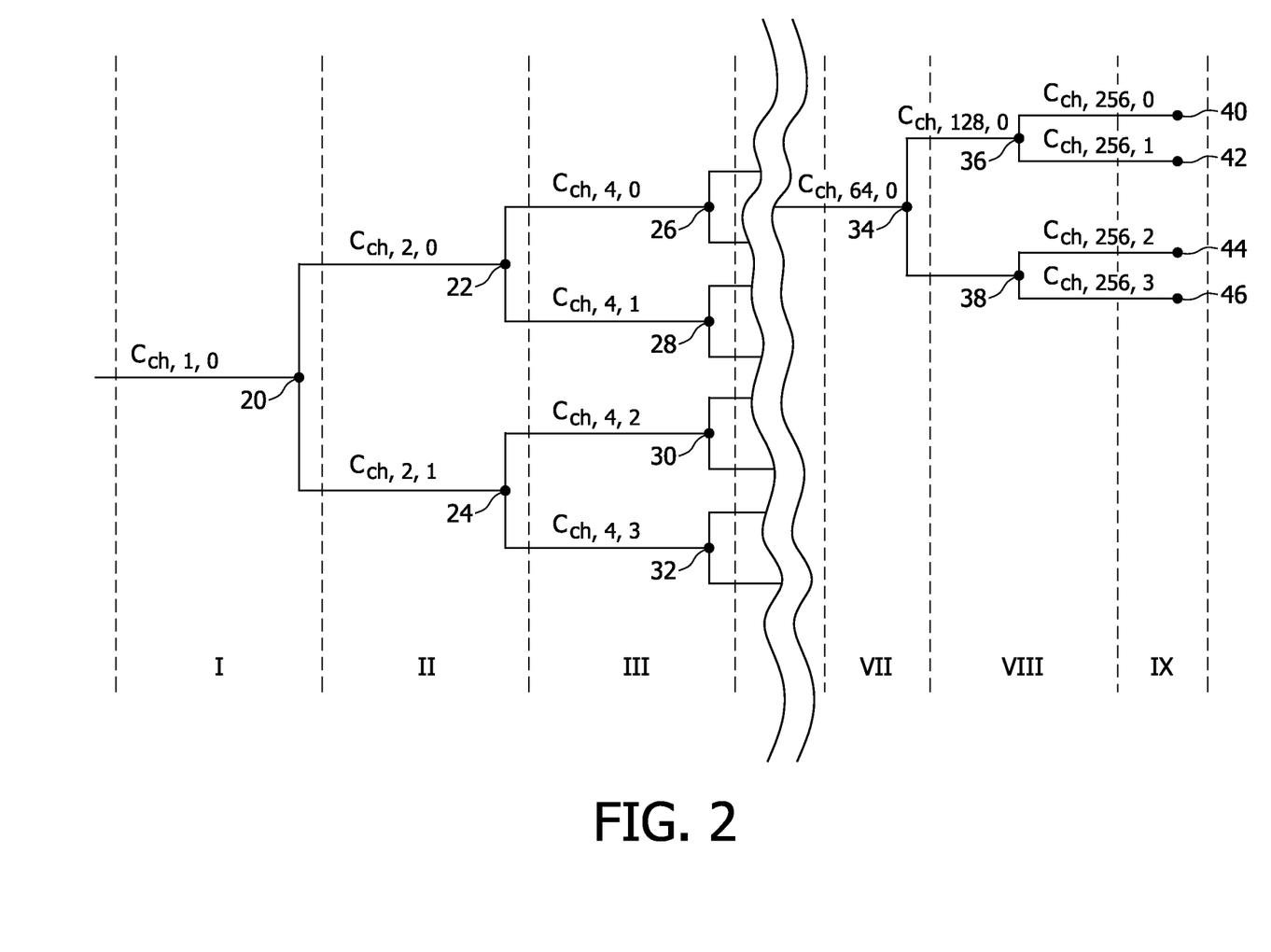
FIG. 2 is an illustration of an OVSF code tree used in the system of FIG. 1.

Channelization code $C_i$ is chosen in the OVSF code tree of FIG. 2, for example. In FIG. 2, the notation $C_{ch, SF, n}$ denotes the $n^{th}$ channelization code with spreading factor SF.

The code tree of FIG. 2 and the allocation of each code to respective channels is described in the 3GPP TS 25.213 standard.

In FIG. 2, only code tree levels I, II and III have been fully represented and code tree levels VII, VIII and IX have only been partially shown. Code tree levels IV to VI are not shown in FIG. 2.

Level I includes only a root node 20 corresponding to channelization code $C_{ch,1,0}$.

Level II includes two child nodes 22 and 24 of root node 20. Nodes 22 and 24 correspond to, respectively, channelization codes $C_{ch,2,0}$ and $C_{ch,2,1}$. These two channelization codes are orthogonal. In level II, each channelization code has a spreading factor equal to two.

Nodes 22 and 24 are also parent nodes for child nodes 26, 28 and 30, 32, respectively. Nodes 26, 28, 30 and 32 correspond to channelization code $C_{ch,4,0}$, $C_{ch,4,1}$, $C_{ch,4,2}$ and $C_{ch,4,3}$. The channelization codes of level III have a spreading factor equal to four and are orthogonal to each other.

Each node of level III is a parent node for two child nodes in level IV and so on.

FIG. 2 only shows:
- a node 34 corresponding to channelization code $C_{ch,64,0}$ in level VII,
- two child nodes 36 and 38 corresponding to channelization codes $C_{ch,128,0}$ and $C_{ch,128,1}$ in level VIII, respectively, and
- four nodes 40, 42, 44 and 46 corresponding to channelization codes $C_{ch,256,0}$, $C_{ch,256,1}$, $C_{ch,256,2}$ and $C_{ch,256,3}$, in level IX, respectively.

It should be noted that a channelization code corresponding to one node of the OVSF code tree in FIG. 2 is orthogonal to any channelization code associated with a node in the same level. This channelization code is also orthogonal to any channelization codes associated with a child node of one of the other nodes in the same level. For example, channelization code $C_{ch,2,1}$ is orthogonal to channelization code $C_{ch,2,0}$ as well as to any channelization code associated with child nodes of node 22. As a result, channelization code $C_{ch,2,1}$ is orthogonal to channelization code $C_{ch,256,0}$ or $C_{ch,256,1}$.

Contrary to the above, the channelization code associated with a parent node is not orthogonal to the channelization code associated with its child nodes. For example, channelization code $C_{ch,128,0}$ is not orthogonal to channelization code $C_{ch,256,0}$ or $C_{ch,256,1}$ but is orthogonal to channelization code $C_{ch,256,2}$.

For illustration purposes, we assume that channelization codes $C_1$ and $C_2$, defined hereabove, are equal to channelization codes $C_{ch,256,0}$ and $C_{ch,256,1}$, respectively.

The output of each module $S_{pi}$ is connected to an adder 50. Adder 50 adds the chip sequences corresponding to each spread symbol $a_{i,n}$.

Adder 50 outputs the resulting global chip sequence to a scrambler 52. Scrambler 52 scrambles the global chip sequence. More precisely, scrambler 52 multiplies the global chip sequence by a scrambling code S[l] to obtain a scrambled global chip sequence b[l]. Sequence b[l] is transmitted through different modules (not shown) before being radiated in the air by an antenna 56 as a radio signal 58. Radio signal 58 is known as a "downlink signal" in CDMA communication systems.

Receiver 6 has an antenna 60 to receive radio signal 58 and a radio frequency receiver 62 to convert the received radio signal into a baseband scrambled global chip sequence y[l].

Sequence y[l] can be estimated according to the following relation:

$$y[l]=b[l]*h[l]+v[l] \quad (1)$$

where:
- b[l] is the scrambled global chip sequence,
- h[l] is a time-varying chip-rate discrete-time system,
- v[l] is a perturbation term which models the average gaussian noise and the interference coming from other base stations, and
- symbol "*" is the convolution operation.

Sequence y[l] enters an adaptive equalizer 64 that outputs an estimated scrambled global chip sequence $\hat{b}[1-1_d]$. The equalization of sequence y[l] introduces a delay equal to $1_d$.

The estimated global chip sequence $\hat{b}[1-1_d]$ is received by a descrambler 66 that descrambles the estimated chip sequence. In fact, descrambler 66 multiplies sequence $\hat{b}[1-1_d]$ by a complex conjugate $S^*[1-1_d]$ of the scrambling code $S[1-1_d]$ used in emitter 10 at instant $1-1_d$.

The descrambled global chip sequence is then transmitted to despreader $D_{s1}$ and despreader $D_{sj}$.

Despreader $D_{s1}$ despreads the descrambled global chip sequence to obtain a pilot symbol estimation $\hat{a}_{1,n}$. To do so, despreader $D_{s1}$ multiplies the descrambled global chip sequence by the channelization code $C_1$.

Pilot symbol estimation $\hat{a}_{1,n}$ is transmitted to a subtractor 70 that subtracts from pilot symbol estimation $\hat{a}_{1,n}$ the corresponding expected pilot symbol $a_{1,n}$ to obtain an error e. It is repeated here that pilot symbols are predetermined pilots that are known before reception by receiver 6. Subtractor 70 transmits error e to equalizer 64 so that equalizer 64 can adapt its own coefficients to minimize this error e. A specific embodiment of equalizer 64 will be described in more detail with reference to FIG. 3.

Despreader $D_{sj}$ despreads the descrambled global chip sequence using a conjugate of another channelization code to obtain a symbol estimation $\hat{a}_{j,n}$ of a symbol transmitted through channel j.

Receiver 6 has also a SINR (Signal-to-Interference+Noise Ratio) estimator 80 as well as a speed estimator 82. Estimator 80 computes an estimation of SINR according to a conventional method, for example, and outputs this estimation to equalizer 64.

Estimator 82 computes an estimation of the speed or velocity of receiver 6 and outputs this estimation to equalizer 64.

Figure 3:
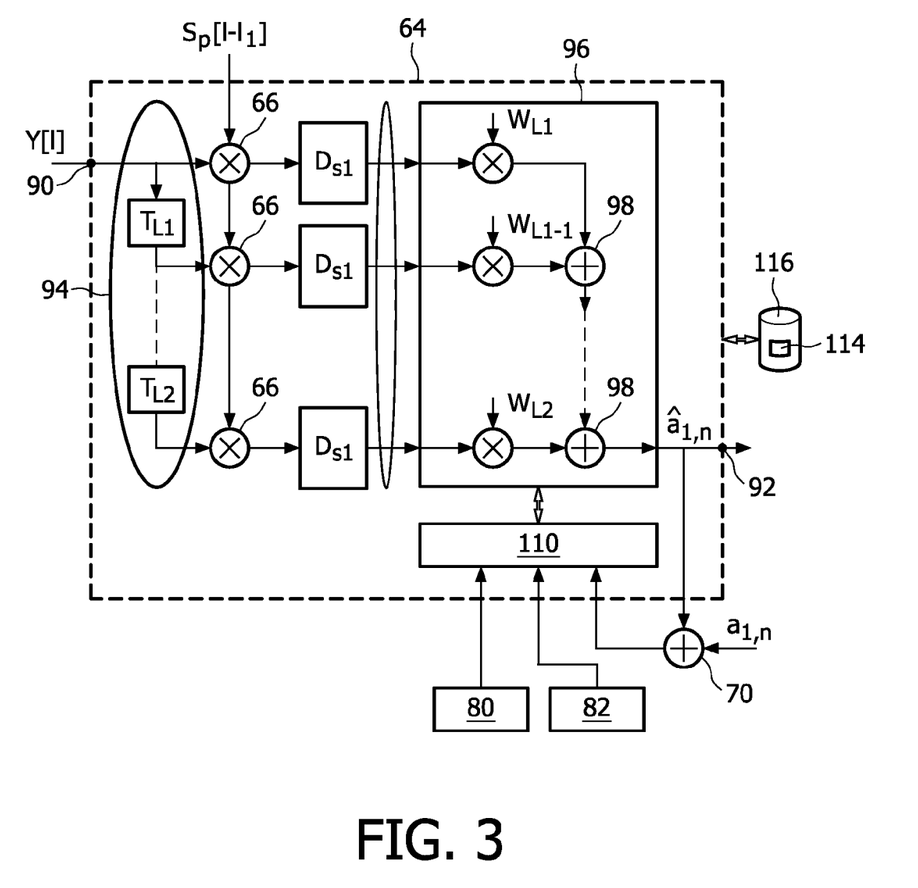
FIG. 3 is a schematic diagram of a specific embodiment of an adaptive equalizer that can be used in the system of FIG. 1.

FIG. 1 shows an embodiment of receiver 6 in which equalization takes place before descrambling and despreading. However, in FIG. 3, equalizer 64 is described in more detail in the case where descrambling and despreading take place before equalization. The general features of the equalizer 64 of FIG. 3 are described in article D1 mentioned hereinabove.

Equalizer 64 has an input 90 to receive sequence y[l] and an output 92 to output pilot symbol estimation $\hat{a}_{1,n}$.

Equalizer 64 includes an adaptive filter 96 defined by the equation $$C(z) = \sum_{m=L1}^{L2} W_m Z^{-m} \quad (2)$$

where:
- $W_m$ with $L_1 \leq m \leq L_2$ are the $L_2-L_1+1$ coefficients of filter 96, and
- $Z^{-m}$ represents a delay of m chip intervals.

Filter 96 may take the form of a finite transversal filter or any other suitable structure. Equalizer 64 adapts the coefficients of filter 96 to minimize the mean-square error due to noise, interferences and interchip interferences. The adaptation of the adaptive equalizer 64 is driven by error e, which indicates to the equalizer the direction into which the coefficients should be moved in order to more accurately represent the data.

Accordingly, equalizer 64 has a tap delay-line 94 connected to input 90 and including $L_1+L_2$ delay block $T_{L1}$ to $T_{L2}$. Each delay block delays sequence y[l] by a chip interval.

Filter 96 has $L_2-L_1+1$ parallel branches. One extremity of each branch is connected to a corresponding input of filter 96, whereas the other extremity is connected to an adder 98 that adds the results outputted by each of the parallel branches. Each parallel branch includes a multiplier that multiplies the signal inputted at one extremity of this branch by a respective coefficient $W_m$. In FIG. 3, the parallel branches are arranged according to the order of the coefficients, so that the uppermost branch multiplies the input signal by $W_{L1}$, whereas the lowest parallel branch multiplies the input signal by coefficient $W_{L2}$.

The input of the uppermost parallel branch is connected to input 90 through despreader $D_{s1}$ and descrambler 66. The other parallel branches are connected to respective outputs of delay block $T_{Li}$ through despreader $D_{s1}$ and descrambler 66. As explained in article D1, the above structure first performs descrambling and despreading before equalization.

Equalizer 64 also comprises a calculator 110 that is able to modify the value of each coefficient $W_m$ of filter 96 so as to adapt equalizer 64 according to channel changes. More precisely, calculator 110 is able to execute an adaptive algorithm that calculates the value of coefficients $W_m$ that minimize error e. To this end, the algorithm executed by calculator 110 is a MMSE (Minimising Mean Square Error) algorithm. Preferably, among the different MMSE algorithms, the adaptive algorithm used in this embodiment is an LMS (Least Mean Square) algorithm or an NLMS (Normalized Least Mean Square) algorithm. LMS and NLMS algorithms are described in further detail in the following document:

"*On the statistical efficiency of the LMS family of adaptive algorithms*" (Bernard Widrow and Max Kamenetsky, ISL—Department of Electrical Engineering, Stanford University, Stanford Calif.).

Like any MMSE algorithm, LMS and NLMS algorithms have a tunable parameter that determines how close the calculated coefficient values are to the optimal solution. In the case of LMS and NLMS algorithms, the tunable parameter is known as the "proportionality constant μ" or "step size μ". Hereinafter, we will use the term "step size μ".

It is noted that a decreasing step-size μ results in calculating coefficients which are closer to the optimal solution, but also in an increase of the number of operations necessary to calculate the coefficients $W_m$. As a result, it is not desirable to have a step-size μ which is permanently very small.

In this embodiment, calculator 110 chooses step-size μ according to a number Δ as well as according to SINR estimation and speed estimation outputted by estimators 80 and 82. For example, calculator 110 uses a lookup table 114 recorded in a memory 116 connected to equalizer 64. Lookup table 114 defines the values of step-size μ according to the values of number Δ, SINR estimation and speed estimation. For example, lookup table 114 is built according to experimental results and then recorded in memory 116 so that equalizer 64 can use it.

For example, equalizer 64 can be realized using a programmable electronic calculator which executes instructions recorded in a memory like memory 116. Memory 116 comprises instructions for the execution of the method of FIG. 6.

Figure 4:
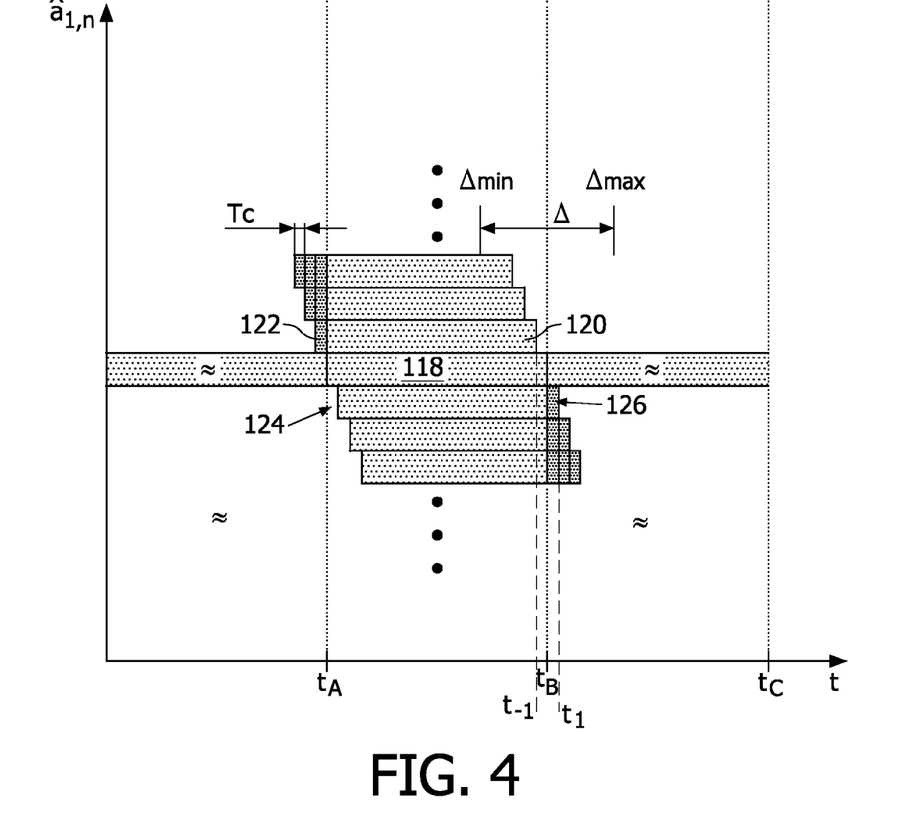
FIG. 4 is a timing chart illustrating received pilot chip sequences in the system of FIG. 1.

Number Δ will now be defined with reference to FIG. 4.

In FIG. 4, the abscissa represents time, whereas the ordinate represents pilot chip sequences.

Instants $t_A$ and $t_B$ correspond to the boundary of a pilot symbol period. Therefore, instants $t_A$ and $t_B$ are spaced apart by the 256 chip intervals that correspond to a pilot symbol 118. At instants $t_A$ and $t_B$ the pilot channelization code $C_1$ is fully orthogonal to any of the other simultaneously used channelization codes. Thus, despreading pilot symbol 118 using every chip received only between instants $t_A$ and $t_B$ results in the most reliable pilot symbol estimation.

However, despreading can also take place around instant $t_B$, at an instant $t_\Delta$ defined as follows:

$$t_\Delta = t_B + \Delta \cdot T_c \quad (3)$$

where:
  $t_B$ is the instant at the end of the pilot symbol period,
  number Δ is an integer that can be positive or negative, and
  $T_c$ is a chip interval.

As illustrated in FIG. 4, if despreading takes place at instant $t_{-1}$, the despreading code is applied to a pilot chip sequence 120 that starts one chip interval before instant $t_A$ and that ends one chip interval before instant $t_B$. Sequence 120 has N−1 chips that pertain to pilot symbol 118 plus one chip 122 that pertains to the previously received pilot symbol. Chip 122 can be seen as additional noise. Thus, because only one of the 256 chips is disrupted, the use of sequence 120 to obtain the pilot symbol estimation $\hat{a}_{1,n}$ leads to a still quite reliable pilot symbol estimation, even if despreading, descrambling and equalization take place at instant $t_{-1}$.

FIG. 4 shows that despreading can also take place at instant $t_{-2}$ and $t_{-3}$.

Despreading can also take place at instant $t_1$, i.e. one chip interval after instant $t_B$. In a similar way as explained for chip sequence 120, at instant $t_1$, the despreading operation is applied to a pilot chip sequence 124 that starts one chip interval after instant $t_A$ and ends one chip interval after instant $t_B$. Sequence 124 has N−1 chips that pertain to the pilot symbol 118 plus one additional chip 126 that pertains to the next pilot symbol to be received. Thus, using sequence 126 to obtain pilot symbol estimation $\hat{a}_{1,n}$ at instant $t_1$ also leads to a quite reliable estimation, because only one of 256 chips is disrupted.

FIG. 4 shows also that despreading can take place at instant $t_2$ and $t_3$.

As can be understood, the reliability of the pilot estimation decreases as the absolute value of number Δ increases. More precisely, it has been determined that number Δ should be bounded by upper and lower limits $\Delta_{max}$ and $\Delta_{min}$, respectively, to avoid a diverging effect on the equalizer performance. It has been shown that the absolute value of limits $\Delta_{min}$ and $\Delta_{max}$ should be at least twice smaller than the smallest-used spreading factor. For example, in a UMTS system, if the presently used smallest spreading factor is sixteen, the absolute value of limits $\Delta_{min}$ and $\Delta_{max}$ should be strictly inferior to eight. For example, in this situation, the absolute value of limits $\Delta_{min}$ and $\Delta_{max}$ is chosen to be equal to five or four.

Figure 5:
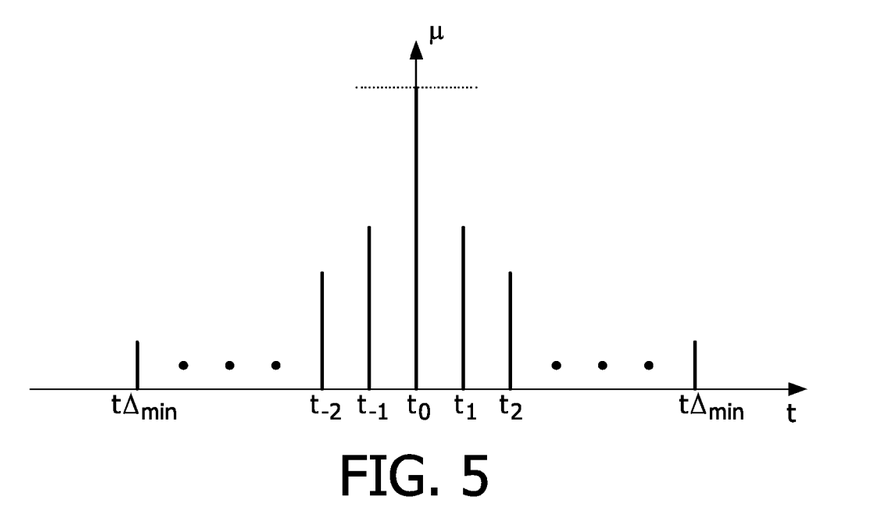
FIG. 5 is a graph showing the values of a tunable parameter of the adaptive equalizer of FIG. 3 according to a number Δ.

In this specification, it is proposed to adjust the value of step-size μ according to number Δ to compensate for the decreasing reliability of the pilot symbol estimation as the absolute value of number Δ increases. A possible solution is shown in FIG. 5. The horizontal axis represents the time at which despreading and adaptation of the equalizer coefficients take place, and the vertical axis represents the value of step-size μ. Instant $t_0$ corresponds to instant $t_B$, for example.

As shown in FIG. 5, the value of step-size μ decreases as the absolute value of number Δ increases. A decrease of the value of step-size μ leads to an increase of the reliability of the adaptive algorithm. Thus, the adjustment of the step-size μ according to number Δ is used in this embodiment to compensate for the reliability diminution of the pilot symbol estimation that occurs as the absolute value of number Δ increases. Furthermore, increasing the step-size μ as the absolute value of number Δ decreases, allows to reduce the number of operations necessary to calculate the equalizer coefficient values, for example.

The value of step-size μ at which the best mean square error at instant $t_i$ is achieved is determined experimentally for a receiver moving at a predetermined speed and communicating with a base station with a predetermined SINR. By repeating this operation for different, predetermined SINR and speed values, it is possible to build lookup table 114.

Figure 6:
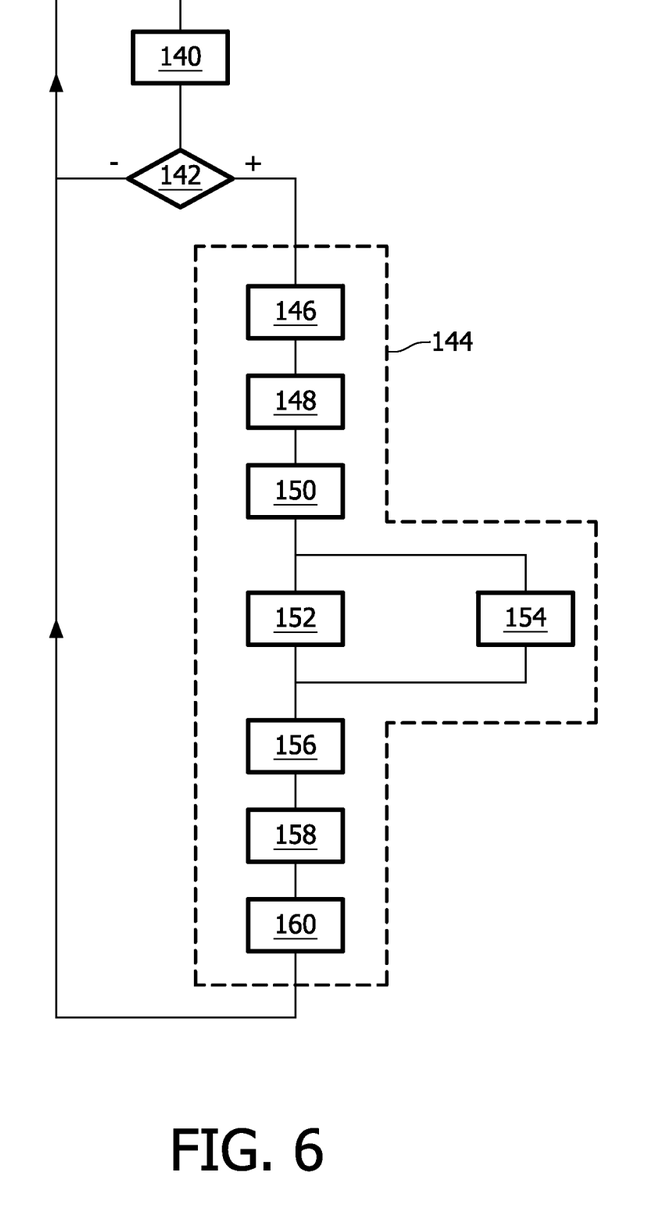
FIG. 6 is a flowchart of a symbol-level adaptation method carried out in the system of FIG. 1.

The operation of receiver 6 will now be described with reference to FIG. 6.

In step 140, receiver 6 receives a new chip. Then, in step 142, calculator 110 determines if the current instant $t_{cur}$ corresponds to an instant $t_i$ where adaptation of the equalizer coefficients can take place. For example, in step 142, calculator 110 determines one number $\Delta_A$ and one number $\Delta_B$ according to the following relations:

$$t_{cur} = t_A + \Delta_A \cdot T_c \quad (4)$$

$$t_{cur} = t_B + \Delta_B \cdot T_c \quad (5)$$

where:
$t_{cur}$ is the current instant, and
$t_A$, $t_B$ and $T_c$ have already been defined hereinabove.

If numbers $\Delta_A$ and $\Delta_B$ are not within limits $\Delta_{min}$ and $\Delta_{max}$, respectively, no adaptation of the coefficient equalizer takes place and the method returns to step 140. This corresponds to a situation where the currently received chip is roughly halfway between instants $t_A$ and $t_B$.

We assume now that the current time $t_{cur}$ is equal to instant $t_{-1}$, for example.

Thus, in step 142, calculator 110 determines that number $\Delta_B$ is within limits set by $\Delta_{min}$ and $\Delta_{max}$. Number $\Delta_B$ in this situation corresponds to number $\Delta$ as defined in FIG. 4. Subsequently, an adaptation of the equalizer coefficients takes place in a phase 144.

At the beginning of phase 144, in a step 146, pilot chip sequence 120 is descrambled using descrambler 66.

Subsequently, in step 148, despreader $D_{s1}$ multiplies the descrambled pilot chip sequence by channelization code $C_1$ to despread the received pilot chip sequence.

In step 150, the then despread pilot chip sequence is filtered using filter 96 to obtain the estimation $\hat{a}_{1,n}$.

In step 152, the current error e is calculated, by subtractor 70, from the current pilot symbol estimation $\hat{a}_{1,n}$ and the expected pilot symbol $a_{1,n}$. In parallel, calculator 110 reads the current SINR estimation and current speed estimation outputted by estimators 80 and 82. Subsequently, in step 156, calculator 110 reads in lookup table 114 the value of step-size $\mu$ corresponding to a number $\Delta$ equal to "−1" and to the read SINR estimation and speed estimation.

In step 158, calculator 110 executes the adaptive algorithm to calculate the new values of the equalizer coefficients that minimize the current error e. During step 158, the step-size $\mu$ used by the adaptive algorithm is the one read in step 156.

Once the new values for coefficients $W_m$ are calculated, in step 160, calculator 110 modifies the current values of coefficients $W_m$ according to the value calculated in step 158. More precisely, in step 160, calculator 110 replaces the current values of coefficients $W_m$ by the new values of these coefficients $W_m$ calculated in step 158. At the end of step 160, the method returns to step 140 to receive the next chip. Thus, the equalizer coefficients are adapted at each chip interval as long as number $\Delta$ is between limits $\Delta_{min}$ and $\Delta_{max}$. This means that during one symbol period, the equalizer coefficients are adapted several times. Accordingly, equalizer 64 is able to more accurately track fast-channel changes.

Many other embodiments are possible. For example, the step-size $\mu$ does not need to be chosen according to a speed estimation or a SINR estimation. The above teachings can be implemented in equalizers having a different structure from the one described in detail in FIG. 3. For example, the structure of equalizer 64 can be the so-called fractionally spaced scheme as described in the following document:

F. Petre, M. Moonen, M. Engels, B. Gyselinckx, and H. D. Man, "Pilot aided adaptive chip equalizer receiver for interference suppression in ds-cdma forward link," Proc. Vehicular Technology Conf., pp. 303-308, September 2000.

The family of MMSE algorithms includes many other iterative algorithms that minimize the square of error e. For example, this family also includes the RLS (Recursive Least Square) algorithm.

The symbol-level adaptation method has been described in the particular case of an equalizer implemented in a user equipment. However, the above teaching applies to any orthogonal CDMA receiver, like the one implemented in the base station, for example.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

The invention claimed is:

1. A symbol-level adaptation method to adapt at least one coefficient of an equalizer, the equalizer being used in an orthogonal CDMA, Code Division Multiple Access, receiver to correct channel distortions at chip level, wherein the method comprises:

a) executing an adaptive algorithm that calculates the value of the equalizer coefficient that minimizes an error between a pilot symbol estimation outputted by a despreader and the corresponding expected pilot symbol, the adaptive algorithm having a tunable parameter ($\mu$) that determines how close the calculated coefficient value is to the optimal solution;

wherein step a) is based on an estimation made over a pilot symbol period by means of a despreading performed on a number of chips corresponding to an orthogonal pilot channelization code; and that it further involves the steps of:

receiving a new chip;

determining whether the current instant $t_{cur}$ corresponds to an instant where adaptation of equalizer coefficients can take place, by computing two values $\Delta_A$ and $\Delta_B$ as follows:

$$t_{cur} = t_A + \Delta_A T_c$$

$$t_{cur} = t_B + \Delta_B T_c$$

with $t_A$ and $t_B$ being respectively the beginning and the end of a pilot symbol period and $T_c$ being a chip interval, and testing whether $\Delta_A$ and $\Delta_B$ are within limits $\Delta_{min}$ and $\Delta_{max}$; and if $\Delta_A$ and $\Delta_B$ are not within Predetermined limits $\Delta_{min}$ and $\Delta_{max}$, then performing no adaptation of the coefficient equalizer and returning to the first step for processing the next chip;

if $\Delta_A$ and $\Delta_B$ are within limits $\Delta_{min}$ and $\Delta_{max}$, then descrambling and dispreading said pilot chip sequence; and filtering said despread pilot chip sequence to obtain an estimation of said pilot symbol;

computing a current error by subtracting said estimated pilot symbol and an expected pilot symbol;

reading an SINR estimation and a current speed estimation generated by an SINR estimator and a speeding estimator;

using $\Delta_B$ and the SINR estimation and the current speed estimation for accessing a look-up table for reading a value of step-size u; and executing the adaptive algorithm to calculate new values of the equalizer coefficient by using said value $\mu$;

modifying the current values of the equalizer coefficient; and returning to the first step for processing the next chip.

2. The method according to claim 1, wherein the adaptive algorithm is a MMSE, Minimum Mean Square Error, algorithm and wherein the tunable parameter is a step-size $\mu$ and wherein step-size $\mu$ is lowered as the absolute value of $\Delta_B$ increases.

3. A memory comprising instructions for executing a method according to claim 1 when the instructions are executed by an electronic calculator.

* * * * *

UNITED STATES PATENT AND TRADEMARK OFFICE
CERTIFICATE OF CORRECTION

PATENT NO. : 8,462,756 B2
APPLICATION NO. : 12/162818
DATED : June 11, 2013
INVENTOR(S) : Ahmet Bastug and Pierre Demaj Page 1 of 1

It is certified that error appears in the above-identified patent and that said Letters Patent is hereby corrected as shown below:

In the Claims:

Column 10, line 58, "u" should be --µ--

Signed and Sealed this
Thirteenth Day of August, 2013

Teresa Stanek Rea
*Acting Director of the United States Patent and Trademark Office*